United States Patent
Kwon

(10) Patent No.: US 9,571,257 B2
(45) Date of Patent: Feb. 14, 2017

(54) SYSTEM AND METHOD FOR WIRELESS CHANNEL ASSESSMENT

(71) Applicant: NEWRACOM, Inc., Irvine, CA (US)

(72) Inventor: Young Hoon Kwon, Laguna Niguel, CA (US)

(73) Assignee: NEWRACOM, Inc., Irvine, CA (US)

( * ) Notice: Subject to any disclaimer, the term of this patent is extended or adjusted under 35 U.S.C. 154(b) by 0 days.

(21) Appl. No.: 14/824,043

(22) Filed: Aug. 11, 2015

(65) Prior Publication Data

US 2016/0056929 A1 Feb. 25, 2016

Related U.S. Application Data

(60) Provisional application No. 62/069,659, filed on Oct. 28, 2014, provisional application No. 62/039,350, filed on Aug. 19, 2014.

(51) Int. Cl.
| | |
|---|---|
| *H04W 4/00* | (2009.01) |
| *H04L 5/00* | (2006.01) |
| *H04W 74/08* | (2009.01) |
| *H04L 12/26* | (2006.01) |
| *H04W 84/12* | (2009.01) |

(52) U.S. Cl.
CPC .......... *H04L 5/006* (2013.01); *H04W 74/0808* (2013.01); *H04L 43/16* (2013.01); *H04W 84/12* (2013.01)

(58) Field of Classification Search
CPC ..... H04L 5/006; H04L 43/16; H04W 74/0808; H04W 84/12
See application file for complete search history.

(56) References Cited

U.S. PATENT DOCUMENTS

| | | | | |
|---|---|---|---|---|
| 2013/0208607 A1* | 8/2013 | Abraham | ............... | H04W 16/26 370/252 |
| 2013/0223250 A1* | 8/2013 | Matsuo | ............. | H04W 74/0808 370/252 |
| 2015/0071180 A1* | 3/2015 | Cavalcante | ....... | H04W 74/0816 370/329 |
| 2016/0014807 A1* | 1/2016 | Ghosh | ................... | H04L 5/0048 370/329 |

(Continued)

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

(Continued)

*Primary Examiner* — Clemence Han
(74) *Attorney, Agent, or Firm* — Nicholson, De Vos, Webster & Elliot, LLP

(57) ABSTRACT

A method is implemented by a network device to improve efficiency for clear channel assessment (CCA) by tracking a set of neighboring stations in a wireless local area network (WLAN). The method includes detecting, by the first network device, a wireless signal from a second network device on a wireless medium. A target network device of the wireless signal detects whether the target network device is a neighbor of the first network device. The wireless medium is determined to be busy in response to determining that the target network device is a neighbor of the first network device.

13 Claims, 15 Drawing Sheets

(56) References Cited

U.S. PATENT DOCUMENTS

2016/0050691 A1* 2/2016 Jauh .................. H04W 74/0808
370/252

OTHER PUBLICATIONS

IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

* cited by examiner

Conservative medium access (Low CCA threshold)

Aggressive medium access (High CCA threshold)

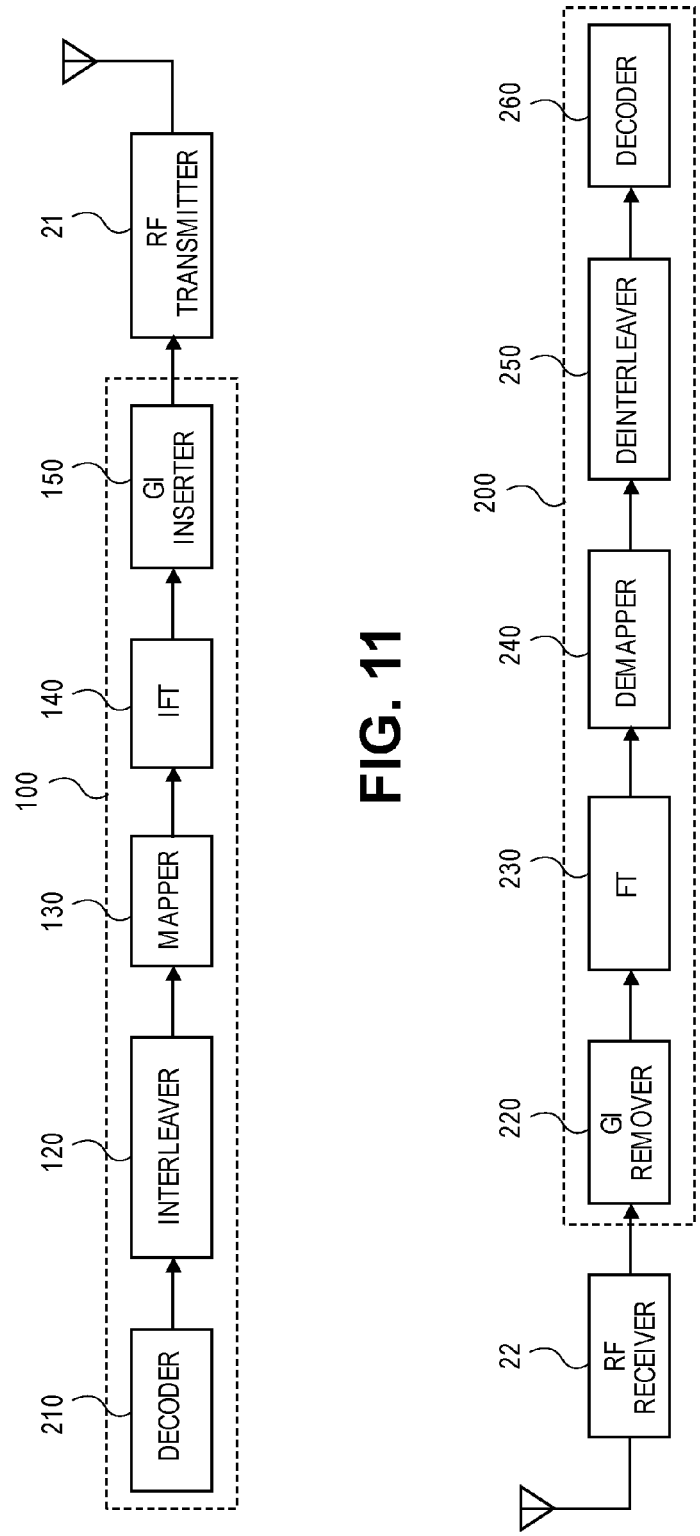

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) | ature
SYSTEM AND METHOD FOR WIRELESS CHANNEL ASSESSMENT

CROSS-REFERENCE TO RELATED APPLICATION

This application claims priority to U.S. Provisional Patent Application No. 62/039,350, filed on Aug. 19, 2014 and U.S. Provisional Patent Application No. 62/069,659 filed Oct. 28, 2014.

FIELD OF INVENTION

The embodiments of the invention are related to the field of wireless local area network (WLAN) operation. More specifically, the embodiments of the invention relate to a method and system for improving the efficiency in assessing the availability of the wireless medium for communication amongst a set of stations and/or access points. Other embodiments are also disclosed.

BACKGROUND

Institute of Electrical and Electronics Engineers (IEEE) 802.11 is a set of physical and media access control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHs spacing dependent on the regulations of the respective country or territory.

Communication on any given channel of either the 2.4 GHz or the 5 GHz band between network elements of the WLAN utilizes the clear channel assessment (CCA) protocol. CCA is defined in the IEEE 802.11 standard as part of the Physical Medium Dependent (PMD) and Physical Layer Convergence Protocol (PLCP) layer. Clear Channel Assessment is composed of two related functions, carrier sense (CS) and energy detection (ED).

Carrier sense (CS) refers to the ability of the receiver to detect and decode an incoming Wi-Fi signal preamble. In addition, CCA must be reported as BUSY when another Wi-Fi signal preamble is detected, and must be held as BUSY for the length of the received frame as indicated in the frame's PLCP Length field. Typically, any incoming Wi-Fi frame whose PLCP header can be decoded will cause CCA to report the medium as busy for the time required for the frame transmission to complete.

The PLCP header Length field indicates either the number of microseconds required for transmission of the full frame MAC protocol data unit (MPDU) payload, or the number of octets carried in the frame MPDU payload which is then used in combination with the Rate field (which identifies the modulation used for the payload) to determine the time required for MPDU transmission. In any case, the length or rate+length fields of the MPDU give the receiver the information required to de-modulate the frame and determine how long the wireless medium will be busy.

Energy detection (ED) refers to the ability of the receiver to detect the energy level present on a given channel where a discernable Wi-Fi preamble cannot be decoded. ED is based on the noise floor, ambient energy, interference sources, and unidentifiable Wi-Fi transmissions that may have been corrupted but can no longer be decoded. ED cannot predict the exact length of time the wireless medium will be busy, instead ED must sample the wireless medium in every slot time to determine if the energy still exists. ED utilizes a threshold level above which the detected energy level must exceed before the wireless medium is classified as busy or idle. This minimum threshold level can be referred to as the ED threshold level or CCA sensitivity level. The CCA sensitivity level is usually much lower for valid Wi-Fi signals that can be decoded using CS than it is for other signals where a discernable preamble cannot be decoded.

SUMMARY

The embodiments provide a method and system for wireless medium assessment from a station in a wireless communication system such as a wireless local area network (WLAN) implementing IEEE 802.11. The method includes collecting and maintaining information about nearby stations in the wireless communication system by measuring the signal quality (e.g., energy level, signal-to-noise ratio, or similar metrics) of received frames from such stations. The method utilizes this information about nearby stations to ensure that the transmissions of the station will not interfere with its neighbors when assessing whether a shared wireless medium, such as a wireless channel, is in use (e.g., busy or idle). The method identifies the target receiver of each frame that is received during the wireless medium assessment. A check is made whether the received frames have a signal quality below a threshold level. If the received frames have a signal quality below the threshold level then a check is made whether the frames are targeting nearby stations that may have their reception disrupted by the transmission of the station implementing the method. If the energy level is below a threshold and the received frames do not target nearby stations then the station implementing the process can deem the wireless medium idle. This process increases the care with which stations make the determination that the wireless medium is idle and as a consequence enables a high threshold energy level to be set that in turn increases the availability of the wireless medium and thereby the throughput of the wireless communication system. Further, the station implementing the method will be permitted to transmit on the wireless medium when other potential qualifying conditions are met (e.g., after an interframe space (IFS) and/or backoff period in which the wireless medium remains idle). This process alters the conditions under which stations make the determination that transmission is permitted on the shared wireless medium. In particular, the new conditions of this process enable adaptable access to the shared wireless medium based on various factors, including a determination whether a target receiving station of a currently transmitting frame is a neighbor to the station seeking access and/or signal quality level of a current transmission on the shared medium. This adaptability in turn increases the availability of the wireless medium and thereby the throughput of the wireless communication system.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 11 is a schematic block diagram exemplifying a transmitting signal processor in a WLAN device.

FIG. 12 is a schematic block diagram exemplifying a receiving signal processing unit in the WLAN.

DETAILED DESCRIPTION

Figure 1:
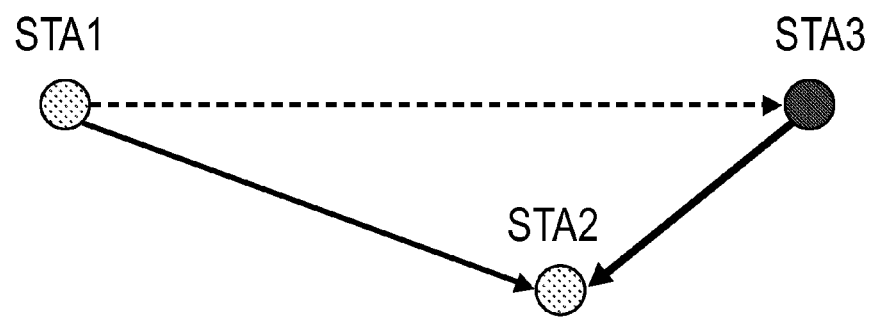
FIG. 1 is a diagram of one embodiment of a WLAN that illustrates an example of possible issues of increasing the CCA threshold value.

The embodiments provide a method and system for wireless medium assessment from a station in a wireless communication system such as a wireless local area network (WLAN) implementing IEEE 802.11. The method includes collecting and maintaining information about nearby stations in the wireless communication system by measuring the signal quality (e.g., energy level, signal-to-noise ratio, or similar metrics) of received frames from such stations. The method utilizes this information about nearby stations to ensure that the transmissions of the station will not interfere with its neighbors when assessing whether a shared wireless medium, such as a wireless channel, is in use (e.g., busy or idle). The method identifies the target receiver of each frame that is received during the wireless medium assessment. A check is made whether the received frames have a signal quality level below a threshold level. If the received frames have a signal quality level below the threshold level then a check is made whether the frames are targeting nearby stations that may have their reception disrupted by the transmission of the station implementing the method. If the signal quality level is below a threshold and the received frames do not target nearby stations then the station implementing the process can deem the wireless medium idle. Further, the station implementing the method will be permitted to transmit on the wireless medium when other potential qualifying conditions are met (e.g., after an IFS and/or backoff period in which the wireless medium remains idle). This process alters the conditions under which stations make the determination that transmission is permitted on the shared wireless medium. In particular, the new conditions of this process enable adaptable access to the shared medium based on various factors, including a determination whether a target receiving station of a currently transmitting frame is a neighbor to the station seeking access and/or signal quality level of a current transmission on the shared wireless medium. This adaptability in turn increases the availability of the wireless medium and thereby the throughput of the wireless communication system.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include stations and access points in wireless communications systems such as wireless local area network (WLAN). Stations are devices connected to and communicating in a WLAN including client or user devices that connect to the WLAN via access points. Access points are network devices that may be specialized wireless access points that can communicate with other network devices in the WLAN via the wireless medium or via wired connections.

IEEE 802.11 based WLAN systems rely on Clear-Channel-Assessment (CCA), in the physical layer (PHY) that determines the current state of use of the wireless medium (WM), such that a station will access a given wireless channel only when the WM becomes idle (i.e., there is no transmission on the wireless medium and other qualifying conditions are met). Some CCA rule mechanisms, for example some of the rule mechanisms defined in IEEE 802.11, indicate that the primary channel is busy, if one of the conditions listed in Table I is met, otherwise the primary channel is determined to be idle. If the primary channel is idle, then the PHY layer will check the secondary channels for availability.

TABLE I

| Operating Channel Width | Conditions |
| --- | --- |
| 20 Mhz, 40 MHz, 80 MHz, 160 MHz or 80 + 80 MHz | The start of a 20 MHz NON_HT PDU in the primary 20 MHz channel as defined in 18.3.10.6 (CCA requirements). The start of an HT PPDU under the conditions defined in 20.3.21.5 (CCA sensitivity). The start of a 20 MHz VHT PPDU in the primary 20 MHz channel at or above −82 dBm. |
| 40 MHz, 80 MHz, 160 MHz or 80 + 80 MHz | The start of a 40 MHz non-HT duplicate or VHT PPDU in the primary 40 MHz channel at or above −79 dBm |
| 80 MHz, 160 MHz or 80 + 80 MHz | The start of an 80 MHz non-HT duplicate or VHT PPDU in the primary 80 MHz channel at or above −76 dBM |
| 160 MHz or 80 + 80 MHz | The start of a 160 MHz or 80 + 80 MHz non-HT duplicate or VHT PPDU at or above −73 dBM |

However, with the increased demand on WLANs there is a need for more aggressive channel access, which requires increasing the CCA threshold value, to increase system throughput. However, increasing the CCA threshold value may result in more frequent packet collision and degradation of Quality of Service (QoS) of packet delivery.

Current 802.11 based WLAN communication systems are being deployed in diverse environments. These environments are characterized by the existence of many access points (AP) and non-AP stations in geographically limited areas. Increased interference from neighboring network devices gives rise to performance degradation. Additionally, WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved throughput requiring improvements in the availability of the wireless medium.

In this regard, when a station (STA) is transmitting a packet over the wireless medium, nearby STAs are not allowed to transmit to prevent collisions from happening. The area that nearby STAs are prohibited is determined by the CCA sensitivity or threshold value. In a dense WLAN environment, which is a target of WLAN development, the current CCA threshold value (−82 dBm for 20 MHz) tends to be too conservative such that transmission efficiency is diminished or sub-optimal. To enhance the WLAN system throughput and network efficiency, increasing the CCA threshold value is a possible solution. However, simply increasing the CCA threshold value (i.e., lowering CCA sensitivity) may cause other problems that may in some instances degrade network performance. The CCA threshold value is used herein as a value of CCA sensitivity representing a current signal quality level above which a signal must reach to render an associated wireless channel busy. The example embodiments described herein provide examples of the use of carrier sense (CS) in relation to the CCA sensitivity and CCA thresholds, however one skilled in the art would understand that energy detection (ED) can also be utilized in a similar fashion.

If the CCA threshold value is increased, transmission throughput could be increased, because each STA can be more aggressive in assessing the wireless medium, and thus the STA may transmit a frame more frequently. However, this aggressive transmission approach may occur even though there is a frame already occupying the wireless medium. This can result in an increased probability of packet collision, and can result in severe performance degradation under some circumstances or configurations such as for cell edge STAs.

FIG. 1 is a diagram of one embodiment of a WLAN that illustrates an example of possible issues of increasing the CCA threshold value. As shown in this figure, when a first station (STA1) is transmitting a frame to a second station (STA2), a third nearby station (STA3) at the same time assesses the current status of the wireless medium and makes a wireless medium access decision based on received signal strength/quality of the frame being transmitted from STA1 to STA2. This implies that STA3's decision is solely based on transmitter's (STA1's) activity only. However, STA3 cannot determine how much of an impact its own potential transmission would have on the possible 'victim' station (i.e., STA2). As the CCA threshold is raised higher, more STAs closer to a transmitting STA1 will be able to participate in the wireless medium access, which can result is an increased probability that these additional stations will make a transmission (e.g., STA3's transmission), that will interfere with another station's reception (e.g., STA2's reception).

Figure 2A:
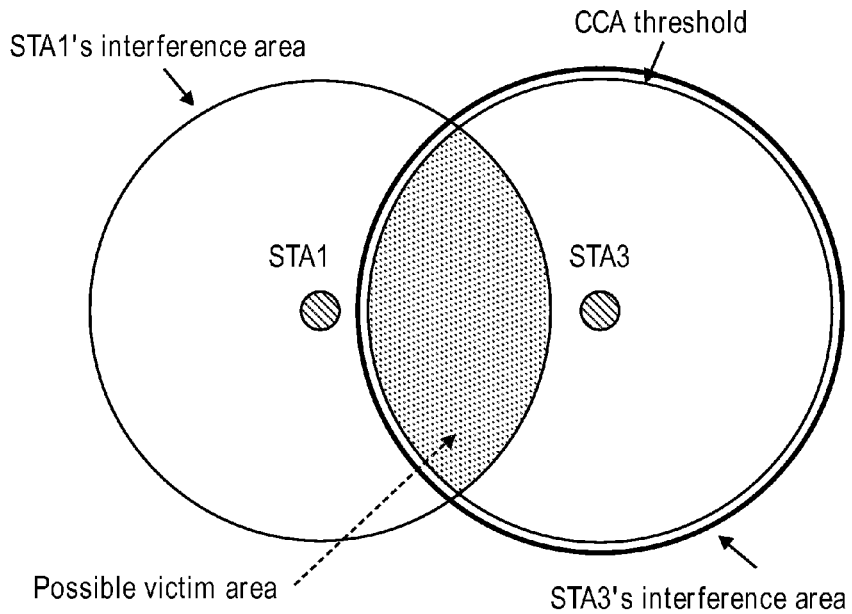
FIG. 2A is a diagram illustrating the effect of changing the CCA threshold where in this case a low CCA threshold is utilized.
Figure 2B:
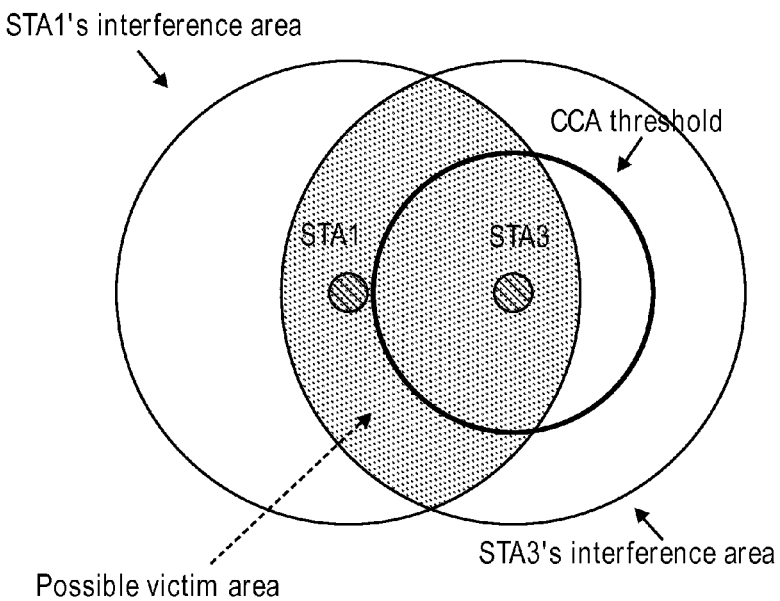
FIG. 2B is a diagram illustrating the effect of changing the CCA threshold where in this case a high CCA threshold is utilized.

This issue is illustrated in FIGS. 2A and 2B as well. In these figures, there are two stations (STA1 and STA3) and when STA3 is assessing the wireless medium, STA1 is transmitting a frame to another station. In STA3's perspective, two different areas are defined. STA3's interference area is an area within which signal quality (e.g., energy level) of STA3's transmission is high. Therefore, if there is a station inside STA3's interference area receiving a frame from another station while STA3 is transmitting a frame to its own target destination station, the reception of the station inside STA3's interference area will be highly interfered by STA3's transmission. In contrast, the CCA threshold area is an area that STA3 will assess the wireless medium as busy if there's a station transmitting a signal that is within the CCA threshold area since the signal will be received at STA3 and have a signal quality above the threshold.

FIGS. 2A and 2B are diagrams that further illustrate the effect of changing the CCA threshold value. If STA1 is outside of STA3's CCA threshold area (as shown in FIG. 2B where STA3 has an aggressive (high) CCA threshold), STA3 assesses the wireless medium to be idle because there is no station transmitting a frame within STA3's CCA threshold area (assuming in this example no other stations are nearby). STA3 may thereafter determine that it is clear to transmit if the channel remains idle for some IFS time period, a backoff time, and/or similar conditions are present. Therefore, STA3 can determines that it is allowed to transmit its own frame over the wireless medium as the CCA result is a determination that the wireless medium is idle. However, if STA3 transmits a frame, its transmission will interfere with stations receiving a frame within the STA3's interference area. If the destination station (e.g., STA2 as in FIG. 1) of STA1's transmission is within the STA3's interference area (i.e., the possible victim area), performance of the stations in this interference area (e.g., STA2's reception of STA1's frame) can be degraded due to STA3's transmission.

In the first example of FIG. 2A, STA3's CCA threshold area is nearly identical (as shown) with STA3's interference area. However, in the second example shown in FIG. 2B, STA3's CCA threshold area is smaller than STA3's interference area, due to the CCA threshold being increased. Therefore, even though STA1 is outside of STA3's CCA threshold area for both cases, the possible victim area of FIG. 2B is larger than that of FIG. 2A. This implies that if a station's CCA threshold is increased (i.e., the radius of the CCA threshold area is decreased), there is an increased probability that the station's transmission will interfere with other station's reception.

One skilled in the art would understand that while the CCA threshold areas and station interference areas are illustrated as circular and as concentric circles around their respective stations, the geographical area covered by a CCA threshold area or an interference area may be irregular and may be affected by the transmitting power of the stations, antenna pattern, geographical features (e.g., hills, flora, and similar natural objects), man-made objects (e.g., walls, furniture and similar structures), atmospheric conditions and similar environmental and signal conditions that affect the signal quality over a geographical area. Thus, there is not a strict correspondence between physical proximity and signal quality. For sake of clarity and illustration, the example generally assume a rough correlation, however, one skilled in the art would understand that depending on the environment there may be some deviation from such correspondence.

In some embodiments, an enhanced CCA or "receiver-aware CCA" is applicable where it is possible to provide an additional screening on top of other CCA processes. In particular, this enhanced CCA may be based on the target receiver information of the packet such that each access point (AP) or station (STA) maintains some equivalent of a set or list of nearby/neighboring STAs. When assessing the wireless medium (i.e., using CCA), (1) if a received signal quality level of a frame is below a first CCA threshold value, the STA is allowed to access the medium; (2) if a received signal quality level of a fame is above a second CCA threshold value, wherein the second CCA threshold value is higher than the first CCA threshold value, the STA is not allowed to access the medium; and (3) if a received signal quality level of a frame is in between the first and the second CCA threshold values, the STA is allowed to access the medium if information of the target receiver of the packet that is occupying the wireless channel does not match with STAs within the set.

Figure 3:
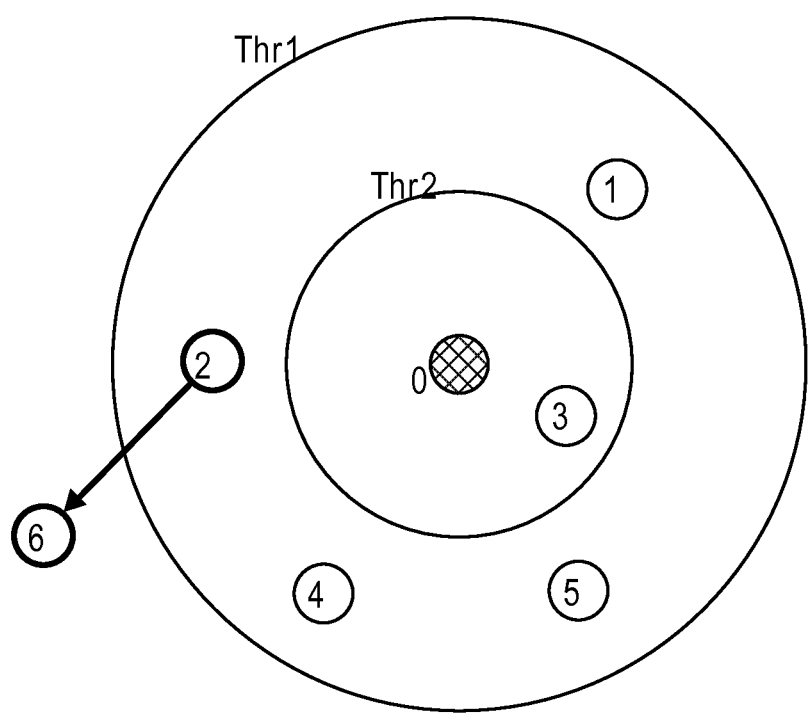
FIG. 3 is a diagram showing a further example of the effect of changing CCA thresholds.

FIG. 3 is a diagram showing a further example of the effect of changing CCA thresholds. The illustration shows an example scenario in which station zero (STA0) maintains a list/set of nearby/neighboring STAs and stations one to five (STA1~STA5) that belong to the set. In this example, station 2 (STA2) is transmitting a frame to station 6 (STA6), when STA0 has a buffered frame to send to STA1. As the received signal level of the frame sent from STA2 at STA0 is between the first CCA threshold value (Thr1) and the second CCA threshold value (Thr2), STA0 then checks the target recipient of the current frame being sent by STA2 that occupies the channel, which is STA6, and compares STA6 with those STAs in the set of neighbors of STA0. Since STA6 is not within the set, STA0 determines that it is permitted to transmit its own frame to STA1 according to the rules of the enhanced CCA.

Although described as maintaining a list or a set of neighboring/nearby stations, in some embodiments a list of neighboring/stations is not maintained. For example, in some embodiments an instantaneous determination may be made regarding whether the target recipient is nearby (i.e., is a neighbor) to another station.

Even though this enhanced CCA process can effectively increase the CCA threshold and thus enables more aggressive spatial reuse without causing interference to the target receiver of a frame that is occupying the wireless medium at the time of CCA, it still has some possible issues as discussed herein. When a first STA (e.g., STA0) initiates a transmission while a second STA (e.g., STA2) is transmitting a frame to a third STA (e.g., STA6), where the third STA (STA6) is far away from the first STA (STA0), interference from the first STA's (STA0) transmission to the third STA's (STA6) reception may not be significant. However, if the third STA (STA6) sends back a frame to the second STA (STA2), for example an acknowledgement frame, the first STA's (STA0) transmission at the second STA (STA2) may result in strong interference, such that reception of the frame from the third STA (STA6) at the second STA (STA2) fails. In the illustrated example, if STA6 sends back an acknowledgement (ACK) frame to STA2 after receiving a data frame from STA2, while STA0 is still transmitting data frames to STA1, due to interference coming from STA0's transmission, reception of an ACK frame at STA2 may fail.

A method for assessing a wireless medium that improves the CCA process is disclosed. More specifically, a method that can protect on-going transmission and the response to the on-going transmission while increasing the chance of re-using the wireless medium is provided. This method can increase system throughput while maintaining Quality of Service of on-going frame transmissions.

On top of the enhanced CCA process outlined above, the embodiments provide a further check if the STA's transmission will not interfere with possible reception at the station that is transmitting the frame that occupies the wireless medium at the time of channel assessment. Therefore, the general concept of the embodiments is that each access point (AP) or station (STA) in a WLAN tracks a set of nearby/neighboring STAs. When assessing the wireless medium via CCA, each station checks whether a received signal quality level of a frame is below a first CCA threshold value, then the STA is allowed to access the medium. If a received signal quality level of a frame is above a second CCA threshold value, wherein the second CCA threshold value is higher than the first CCA threshold value, then the STA is not allowed to access the medium. If a received signal quality of a frame is in between the first and the second CCA threshold values, then the STA is allowed to access the medium if information of the target receiver of the packet that is occupying the wireless channel does not match with STAs within the set of nearby/neighboring STAs and the STA's transmission will not interfere with possible reception at the station that is transmitting the packet.

There can be multiple different ways of achieving the condition of "the STA's transmission will not interfere with possible reception at the station that is transmitting the packet," which will be explained below. The scope of the embodiments is not limited to the embodiments mentioned below, which are provided by way of example not limitation. One skilled in the art would understand that the processes for enhanced CCA described herein are applicable to other contexts.

In one embodiment, a STA is allowed to transmit only during the duration of on-going frame transmission between another set of stations that occupies the wireless medium at the time of the CCA. If the STA's transmission ends before current transmission between the set of stations that occupies the wireless channel ends, then the STA's transmission will not interfere with the reception at the station that is transmitting the packet (e.g., will not interfere with an acknowledgement/block acknowledgement (ACK/BA)). In accordance with this principle, the enhanced CCA process as implemented by each AP or STA maintains some equivalent of a set of nearby STAs to be utilized when assessing the wireless medium (e.g., via CCA). If a received signal quality level of a frame is below a first CCA threshold value, then the STA may determine that the medium is idle. The STA may be allowed to access the medium if the channel remains idle for a backoff and/or IFS time period. If a received signal quality level of a frame is above a second CCA threshold value, wherein the second CCA threshold value is higher than the first CCA threshold value, then the STA is not allowed to access the medium. If a received signal quality level of a frame is between the first and the second CCA threshold values, the channel is idle and the STA is allowed to access the medium (after backoff and/or IFS time period) if information of the target receiver of the packet that is occupying the wireless channel does not match with STAs within the set of nearby/neighboring STAs and the STA can finish its packet transmission (including immediate response frame if required) before the end of packet transmission that currently occupies the wireless medium.

Figure 4:
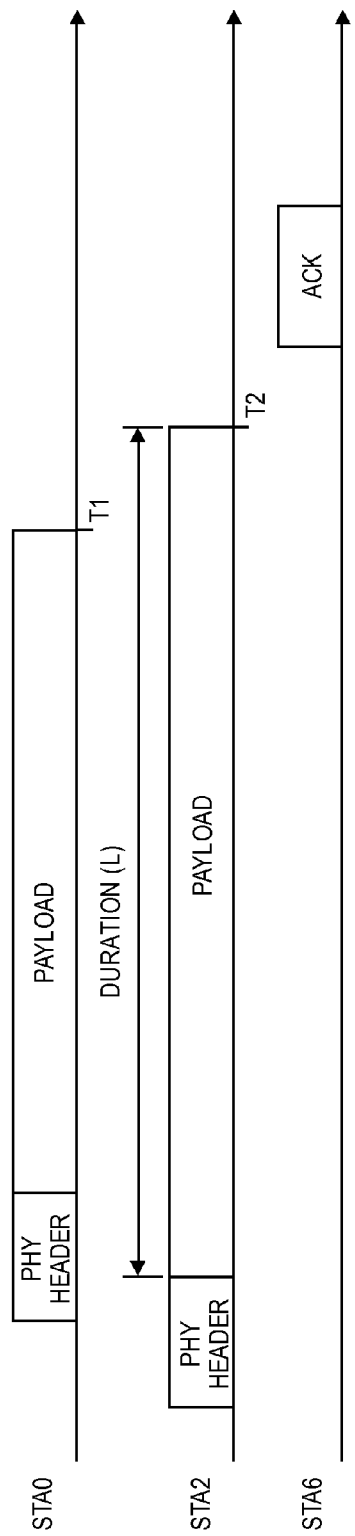
FIG. 4 is a timing diagram that illustrates an example of a CCA process based on the example of FIG. 3.

FIG. 4 is a diagram that illustrates an example of a CCA process based on the above embodiment. The operating circumstances of this example, that is the geographic distribution of network devices in the WLAN, is the same as that of FIG. 3. As described before, STA2 is transmitting a frame to STA6, when STA0 has a buffered frame to send to STA1. STA0 first checks the physical layer header of ongoing frame transmissions to estimate the duration (L) and the target receiver (STA6) of the current frame transmission. As the received signal quality level at STA0 is between the first CCA threshold value (Thr1) and the second CCA threshold value (Thr2), and STA6 is not within the set of nearby/neighboring STAs, STA0 is allowed to send if its transmission can be finished (T1) before the end of STA2's current packet transmission (T2). In this example, a delayed ACK is used for STA0's transmission.

Figure 5:
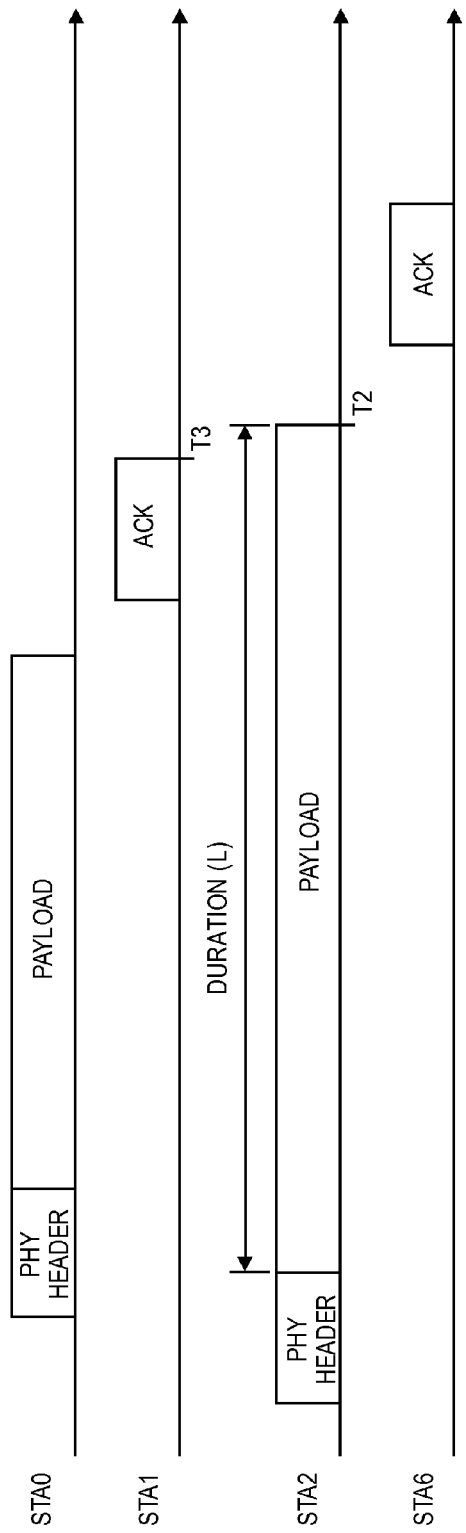
FIG. 5 is a timing diagram that illustrates another example of CCA process based on the example of FIG. 3.

FIG. 5 is a diagram that illustrates another example of a CCA process based on the above embodiment. This example is similar to the one shown in FIG. 4 except that STA0 requires immediate acknowledgement. In this case, as the received signal level at STA0 is between the first CCA threshold value (Thr1) and the second CCA threshold value (Thr2), and STA6 is not within the set of nearby/neighboring STAs, STA0 is allowed to send if its transmission and acknowledgement reception can be finished (T3) before the end of STA2's current packet transmission (T2). In this example, an immediate ACK is used for STA0's transmission.

In another embodiment, a station is allowed to transmit only if the station can beamform the transmission such that its transmitted beam can be null steered toward the transmitter of the on-going frame transmission that occupies the wireless medium at the time of the CCA determination. When a STA seeks to transmit its own packet, the STA checks whether it can perform null steering toward the nearby STA that is currently transmitting a frame. If the STA seeking to transmit determines that it can perform the null steering transmission, then the STA begins transmitting a frame toward its own target. Since a null beam is focused on nearby transmitting STAs, the frame transmission signal level is below a third threshold value at the neighbor STA. Thus this transmission will not interfere with a possible reception at the station that is currently transmitting the frame. With this principle, the alternate enhanced CCA process executes such that each AP or STA maintains some equivalent of a set of nearby/neighboring STAs. When assessing the wireless medium (i.e., CCA) if a received signal quality level of a frame is below a first CCA threshold value, the STA is allowed to access the medium. If a received signal quality level is above a second CCA threshold value, wherein the second CCA threshold value is higher than the first CCA threshold value, then the STA is not allowed to access the medium. If a received signal quality level of a frame is between the first and the second CCA threshold values, then the STA is allowed to access the wireless medium if information of the target receiver of the frame that is occupying the wireless channel does not match with STAs within the set (i.e., not a neighboring station) and the STA's transmission toward the station that is occupying the wireless channel would fall below a third threshold value (i.e., a null is pointed at the station occupying the wireless channel).

Figure 6:
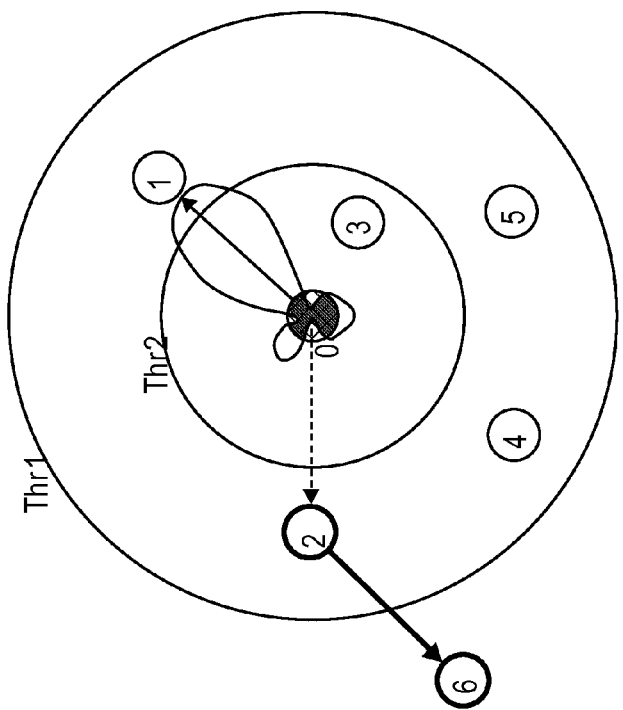
FIG. 6 is a diagram of an example of an alternate enhanced CCA process in a WLAN.

FIG. 6 is a diagram of an example of an alternate enhanced CCA process in a WLAN. The WLAN configuration and operation of this example is the same as that of FIG. 3. As described before, in this example scenario, STA2 is transmitting a frame to STA6, when at the same time STA0 has a buffered frame to send to STA1. In this example, an assumption is made that STA0 has more than one transmit antenna. STA0 checks the physical layer header of the ongoing frame transmission to determine the identity of the target receiver (STA6) of the current packet transmission. As the received signal level at STA0 is between the first CCA threshold value (Thr1) and the second CCA threshold value (Thr2), and STA6 is not a neighbor station, STA0 determines it is allowed to send if its transmission power toward STA2 is below a third threshold value (Thr3) (e.g., a null from the transmission is pointed at STA2).

In this example, STA0 estimates the wireless channel usage between STA0 and STA2 by examining the physical layer header of the frame that is occupying the wireless channel. In another embodiment, STA2 and STA6 further exchange RTS and CTS frames before STA2 sends the frame that is occupying the wireless channel and STA0 estimates the wireless channel usage between STA0 and STA2 by examining the PLCP header of the RTS frame.

In some embodiments, a station is allowed to transmit if the station can adjust its transmission power such that its transmission power is lower than a fourth threshold value. When a STA transmits its own frame, if the STA's transmission power is below a threshold value, then its interference to another STA that is transmitting the packet that occupies the wireless medium at the time of the channel assessment can be controlled. With this principle of operation, in the modified CCA process each AP or STA maintains some equivalent of a set of nearby STAs. When assessing the wireless medium (CCA), if a received frame signal quality level is below a first CCA threshold value, then the STA is allowed to access the medium. If a received frame signal quality is above a second CCA threshold value, wherein the second CCA threshold value is higher than the first CCA threshold value, then the STA is not allowed to access the medium. If a received frame signal quality is between the first and the second CCA threshold values, then the STA is allowed to access the medium if information of the target receiver of the packet that is occupying the wireless channel does not match with STAs within the set and the STA's transmission power is lower than a fourth threshold value. In this embodiment, the STA's transmission power must be (1) below the fourth threshold value such that it does not interfere with the current transmission on the shared wireless medium and (2) high enough to reach a target STA.

This embodiment thus can avoid transmitting a frame even though the received power of a frame that occupies the wireless medium is lower than a CCA threshold value, therefore it can have multiple benefits. Some benefits include (a) that the embodiment can reduce packet collisions, which can increase the system performance, (b) the embodiment can increase the CCA threshold, which can increase the system performance, because it can further protect reception even without additional RTS/CTS overhead, (c) the embodiment does not require any additional signaling overhead, and (d) the embodiment does not require additional decoding of payload for the received frame.

The embodiments for enhanced CCA provide additional screening based on target receiver information of a frame that occupies the wireless medium when a station performs channel assessment. For this purpose, a first station maintains a set of nearby stations, wherein the set comprises information on stations that the first station's transmission may interfere with. When the first station assesses the wireless medium (via CCA), even though a received signal quality level for a frame currently occupying the wireless medium is below a CCA threshold, the first station is not allowed to access the medium in accordance with the processes for enhanced CCA described herein, for example if information of the target receiver of the frame matches with station(s) within the set.

Figure 7:
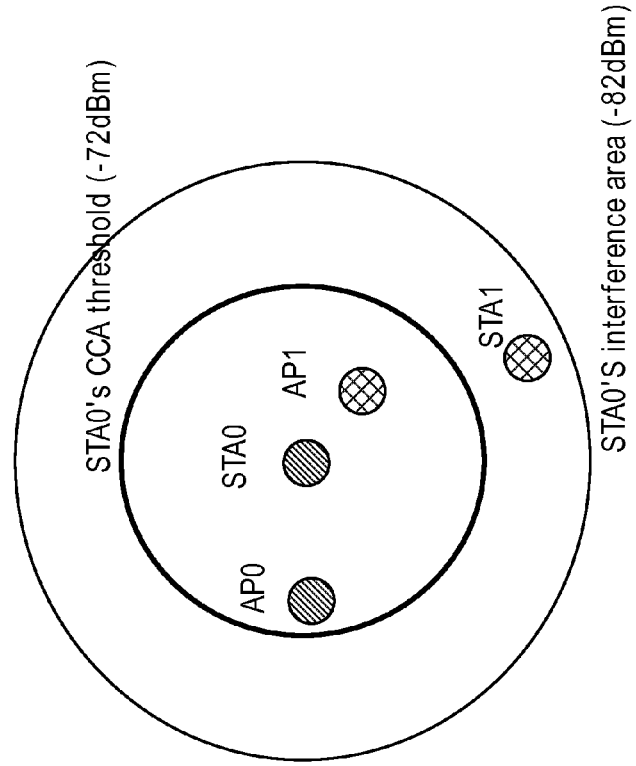
FIG. 7 is a diagram of one embodiment of a geographical distribution of stations and access points in a wireless communication system.

FIG. 7 is a diagram of one example embodiment of a geographical distribution of stations and access points in a wireless communication system. In this example, a baseline CCA threshold value is raised to −72 dBm for a 20 MHz channel. STA0, which is associated with AP0, is closely located relative to AP1, and STA0 knows that its transmission will interfere with AP1's reception (e.g., due to receiving beacon frames from AP1). For example, STA0 has information on AP1's identity such as a basic service set identifier (BSSID), Partial BSSID (PBSSID), and/or Color of AP1. STA1, which is associated with AP1, sends an uplink (UL) frame to AP1, and the signaling (SIG) field of the frame includes information on identity of target receiver, which can comprise Partial BSSID and/or Color of AP1.

STA1's transmission is received at STA0 with −80 dBm, which is below the CCA threshold value in STA0's primary 20 MHz channel. STA0 identifies the start of the received PLCP protocol data unit (PPDU), reads the SIG field of the received PPDU, and identifies Partial BSSID, Color information and/or similar information in the SIG field. Since the Partial BSSID, Color information and/or similar information matches with that of AP0, even though the received signal quality is below CCA threshold, the STA0 considers the wireless medium to be busy and waits until the end of the ongoing PPDU transmission. Because STA0 doesn't send its frame while AP1 is receiving a frame, AP1's reception can be successfully completed without interference and thus this process can increase system capacity while maintaining quality of service.

There can be multiple different embodiments for maintaining the set of nearby stations and access points consistent with the basic concept mentioned above, which will be explained below. One of ordinary skill would understand that the embodiments provided herein are made by way of example and not limitation and that other variations to these embodiments are within the scope of this invention.

In a first embodiment of station set management and the application thereof to the enhanced CCA process, a STA monitors and updates information on interference level from nearby access points (APs) and their corresponding identification. In other embodiments, all types of nearby stations may be tracked (e.g., both APs and non-AP stations). The STA can get this information by measuring received signal strengths of beacon frames sent from nearby APs. The information in the beacon frame can comprise any combination of MAC address, BSSID, Partial BSSID, and Color of the nearby APs. Based on the information, the STA maintains a set of victim APs to which the STA's transmission may cause significant interference. This set can include the identifier information of the nearby APs as well as the signal quality and/or direction relative to the station if it can be derived by the STA.

As applied to the enhanced CCA processes, when the STA assesses the wireless medium, if the STA can detect the start (i.e. a preamble) of a PPDU and if the target receiver of the PPDU includes any of the nearby/neighboring APs identified, the STA may regard the channel as busy at least until the end of current PPDU duration as further modified by the enhanced CCA processes described herein. If a SIG field of the PPDU includes a BSSID or Partial BSSID, this information can be used for identifying the nearby APs. If a SIG field of the PPDU includes a Color of the BSS, the Color information together with Partial BSSID value, can be used for identifying the nearby APs. If a SIG field of the PPDU indicates that current frame is an uplink (UL) frame and the SIG field includes partial BSSID, this information can be used for identifying the nearby APs.

In a second embodiment of station set management and application to the enhanced CCA process, a STA monitors and updates information on interference level from nearby APs and their corresponding identification. The STA can get this information by measuring received signal strength of beacon frames sent from nearby APs. The information on the identification can comprise any combination of MAC address, BSSID, Partial BSSID, and Color of the nearby APs. Based on the information, the STA maintains a set of victim APs to which the STA's transmission may cause significant interference.

As applied to the enhanced CCA processes, when the STA assesses the wireless medium, if the STA can detect the start of a PPDU, then the STA regards the channel busy if the received signal quality level is higher than a first CCA threshold value or the received signal quality level is higher than a second CCA threshold value and the target receiver of the PPDU includes any of the nearby APs identified.

In a third embodiment of the station set management applied to the enhanced CCA processes, the method of the second embodiment is modified such that the second threshold value is higher than or equal to the first threshold value. One example of this embodiment is that the second threshold value is set at −72 dBm in the primary 20 MHz band and the first threshold value is −82 dBm in the primary 20 MHz band. As many times the CCA threshold value for the primary 20 MHz band is −82 dBm, this implies that a station can use this CCA threshold value if the station doesn't manage the set of nearby APs. However, if the station wants to increase the CCA threshold value, the station needs to manage the set of nearby APs and check the identity of the target receiver station of the on-going frame.

In a fourth embodiment of the station set management applied to the enhanced CCA processes, a STA monitors and updates information on interference level from nearby APs and their corresponding identification. The STA can get this information by measuring received signal strength of beacon frames sent from nearby APs. The information on the identification can comprise any combination of MAC address, BSSID, Partial BSSID, and Color of the nearby APs. Based on the information, the STA maintains a set of victim APs to which the STA's transmission may cause significant interference.

As applied to the enhanced CCA processes, when the STA assesses the wireless medium and if the STA can detect the start of a PPDU, then the STA regards the channel busy if the Color information of the received PPDU matches with that of its own BSS, or the Partial BSSID information of the received PPDU matches with any of the nearby APs identified.

In a fifth embodiment of the station set management applied to the enhanced CCA processes, a STA monitors and updates information on interference level from nearby APs and their corresponding identification. The STA can get this information by measuring received signal strength of beacon frames sent from nearby APs. The information on the identification can comprise any combination of MAC address, BSSID, Partial BSSID, and Color of the nearby APs. Based on the information, the STA maintains a set of victim APs to which the STA's transmission may cause significant interference.

As applied to the enhanced CCA processes, when the STA assesses the wireless medium and if the STA can detect the start of a PPDU, the STA regards the channel busy if the received signal quality level of the received frame is higher than a first CCA threshold value, or the received signal quality level of the received frame is higher than a second CCA threshold value and the target receiver of the PPDU includes any of the nearby APs identified, or the received signal quality level of the frame is higher than a third threshold value and the Color information of the received PPDU matches with that of its own BSS.

These embodiments for station set management applied to enhanced CCA processes can avoid transmitting a frame even though the received power of a frame that is occupying the wireless medium is lower than a CCA threshold value, which can have multiple benefits. Some benefits include reduction in down link packet collision and an increase in the CCA threshold value, both of which increase the system performance, because the enhanced CCA processes can further protect reception even without additional request to send (RTS)/clear to send (CTS) overhead. Further, these embodiments do not require any additional signaling overhead and do not require additional decoding of payload to be implemented because they rely on existing PPDU identification data.

Although described as maintaining a list or a set of neighboring/nearby stations, in some embodiments a list of neighboring/stations is not maintained. For example, in some embodiments an instantaneous determination may be made regarding whether the target recipient is nearby (i.e., is a neighbor) to another station using one or more of the techniques described herein.

Figure 8:
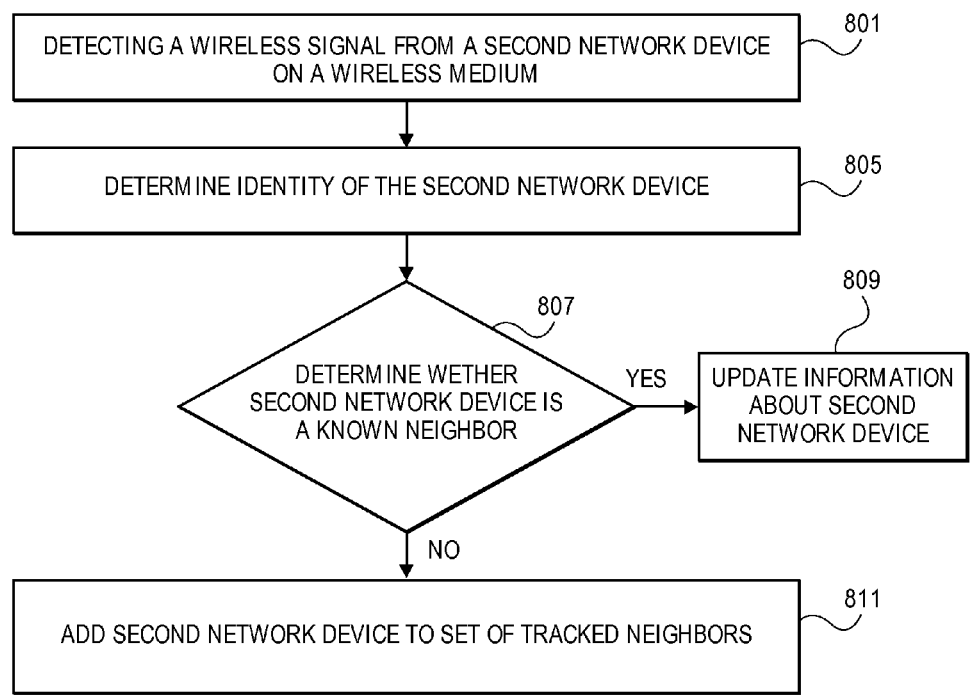
FIG. 8 is a flowchart of one embodiment of a station set management process.

FIG. 8 is a flowchart of one embodiment of the station set tracking management process. This example provides one embodiment of the station tracking of the enhanced CCA process and more specific implementation examples are given in relation to the station tracking process. In one embodiment, the process is initiated in response to detecting a wireless signal from a second network device on a wireless medium (Block 801). For example, a network device such as a WLAN device implementing an enhanced CCA process and station set management process may implement this process. The implementing device can be any station including a non-AP station or an AP. However, in some embodiments only other APs can be tracked as a neighbor for a particular station because non-AP stations do not emit beacon frames that carry the data being utilized to identify a transmitting station. For example, the process can be initiated by an implementing station receiving a beacon frame from an AP in the WLAN. The wireless signal is then examined to determine the identity of the second network device (Block 805). In one example where the received wireless signal is a beacon frame, the beacon frame is then processed to retrieve the identification information for the transmitting station, which may be referred to herein as a station identifier. The station identifier or identity of the second network device in the beacon frame can comprise any combination of MAC address, BSSID, Partial BSSID, and Color (a subset of BSSID information) of the nearby APs.

A check is then made whether the second network device is a known neighbor of the implementing (first) device (Block 807). In the example embodiment, a check is made whether a transmitting AP is already present (i.e. known to the implementing station) by looking up the identifying information in a nearby station set. If the second network device is known to the implementing network device, then the process updates the information it maintains about the second network device (Block 809). For example, if the transmitting station is known to the implementing station then the existing transmitting station entry in a station set (e.g., a list or similar structure) can be updated. In this example, the entry can be replaced with a new signal strength reading, an average can be taken or a similar recordation can take place. If the second network device is not known to the implementing device, then the second network device is added to a set of tracked neighbors if a determined signal quality of the wireless signal meets one or more threshold values (Block 811). For example, if there is not an existing entry, then the process creates a transmitting station entry in the nearby station set if the signal strength of the wireless signal meets a predefined threshold value (e.g., the wireless signal strength of a received beacon frame can be determined using ED or a similar technique). The nearby station set can be any type of data structure, including a database, a simple list, a linked list or similar data structure. In this example, the transmitting station entry can record any identification information including the MAC address (which may require further processing of the MAC layer of the frame), BSSID, Partial BSSID, or AP Color, which is a subset of BSSID information.

Figure 9A:
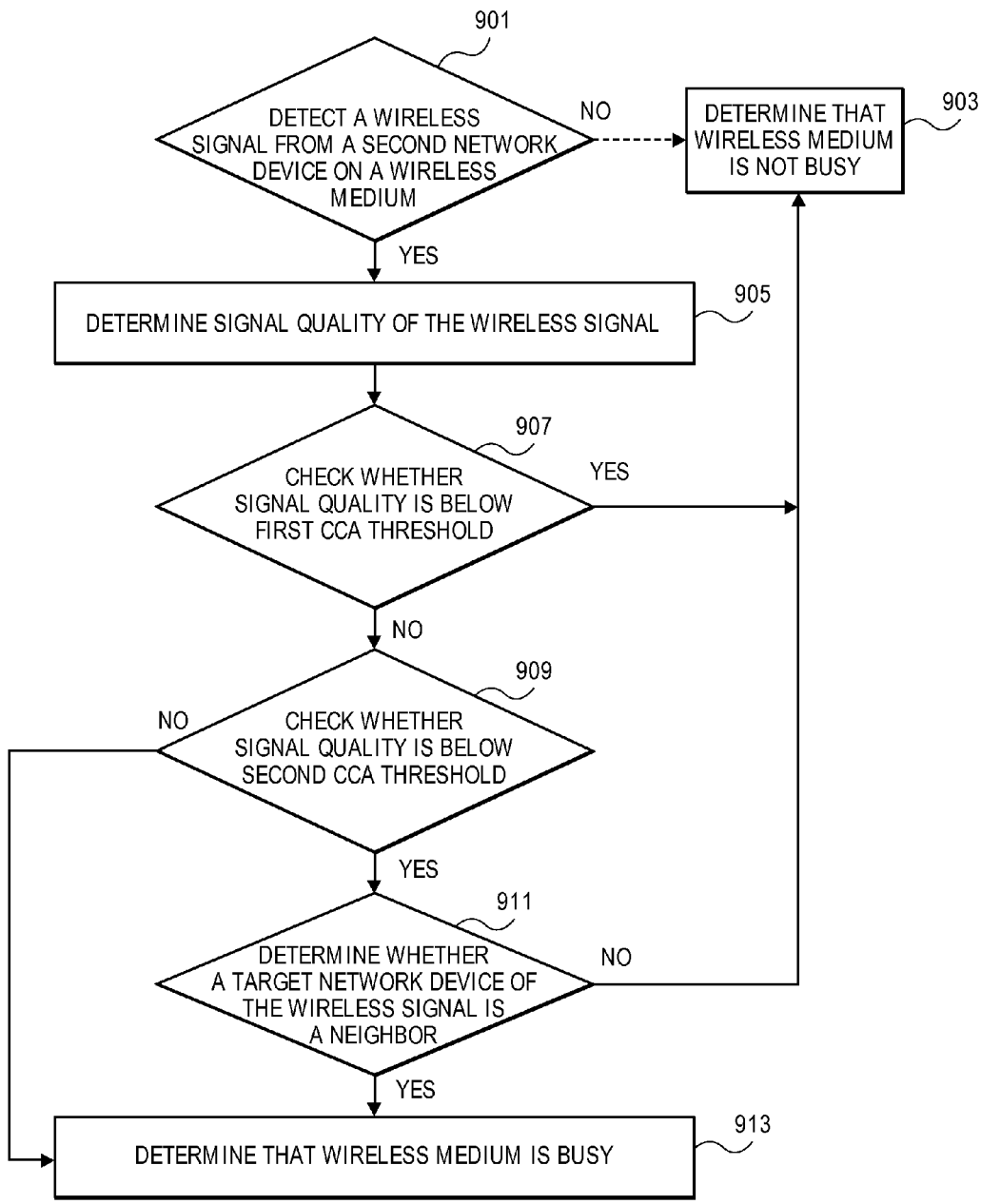
FIG. 9A is a flowchart of one embodiment of a process for an enhanced CCA process.

FIG. 9A is a flowchart of one embodiment of a process for an enhanced CCA process. This process is an overview of an enhanced CCA process as described herein, where an implementing station seeks to transmit on a given wireless channel in a wireless communication system. The enhanced CCA process is described and an example implementation is provided in relation to FIG. 9A. Additional example implementations are described in relation to FIGS. 9B and 9C. The process can start by a first station in response to detecting a wireless signal from a second network device on a wireless medium (Block 901). In one example, the process can be initiated when a frame of any sort is queued for transmission in a first station, then a check is made to determine whether the start of a frame from a second station is detected on the wireless medium (i.e., a frame is already being transmitted on the wireless medium such as a wireless channel). In this example, the receiver of the implementing station can continuously monitor the wireless medium to detect frames on the wireless medium as part of a channel access process and carrier sensing process detailed further herein. In some embodiments, if there is no frame being transmitted on the wireless medium then the medium may be determined to be idle (Block 903). In some instances, following the determination that the medium is idle, the implementing station may transmit its queued frame if other additional qualifications are met (i.e., the medium remains idle for some random backoff and/or IFS time period).

In the example, if there is a frame being transmitted (which can be determined from detecting a preamble in the signal on the wireless medium) then the signal quality level of the frame being received on the wireless medium can be (Block 905). In some instances, the frame cannot be discretely detected, but the signal quality of a transmitting signal can be detected and utilized.

A determination is then made whether the transmitting wireless signal (e.g., a frame) is coming from a distant station that would not be disrupted by simultaneous transmission on the wireless medium. For example, a check is made whether the signal quality of the wireless signal (e.g., a frame) is below a first CCA threshold (e.g., a CCA threshold such as −82 dBm for a 20 Mhz channel) (Block 907). If the signal quality is below this first threshold, then the signal originates far away and the wireless medium is considered to be idle/not busy (Block 903). Following the determination that the shared wireless medium is idle for a random backoff and/or IFS time period, the implementing station may transmit its queued frame. If the signal quality of the received frame is not below the first CCA threshold, then a check is made whether the signal quality is below a second CCA threshold (Block 909). The second CCA threshold represents a more aggressive enhanced CCA process that aims to increase throughput in the wireless communication system by allowing the station to more liberally access the shared wireless medium. If the received frame is not below the second CCA threshold then the wired medium is considered busy (Block 913) and the transmission from the implementing station will not proceed until the current transmission and/or reply is completed and the medium is determined to be idle. If the received frame has a signal strength that is below the second CCA threshold then a check is made whether a target network device of the wireless signal (e.g., a target receiver of the received frame) is a neighbor (e.g., in the nearby station set) (Block 911). A target network device can be determined to be a neighbor by examining station identification information, e.g. a station identifier, contained in the wireless signal. For example, the received frame in the wireless signal can include any one of combination of MAC address, BSSID, Partial BSSID, and Color of the target network device. If the target network device is not a neighbor (e.g., a target receiver of the received frame is not in the set), then the wireless medium is considered not busy or idle (Block 903). Following the determination that the shared wireless medium is idle for a random backoff and/or IFS time period, the implementing station may transmit its queued frame. If the target network device (e.g., a target receiver of the received frame) is a neighbor (e.g., it is in the nearby/neighbor station set), then the wireless medium is considered busy and, in the example, the pending transmission of the queued frame of the implementing device waits until the frame transmission completes and any reply completes before reanalyzing the shared wireless medium for transmission of its queued frame.

Although described above as examining the signal quality of a current transmission on the wireless medium (i.e., comparing the signal strength with one or more CCA threshold values), in some embodiments the method shown in FIG. 9A may determine the status of the shared wireless medium without signal quality analysis. For example, in some embodiments, the method may skip operations 907 and 909 and determine the status of the medium based on whether a target device of the wireless signal currently occupying the wireless medium is nearby or a neighbor to the implementing station. In some other embodiments, the status of the medium may be determined in relation to a single threshold and based on whether a target device of the wireless signal currently occupying the wireless medium is nearby or a neighbor to the implementing station.

Figure 9B:
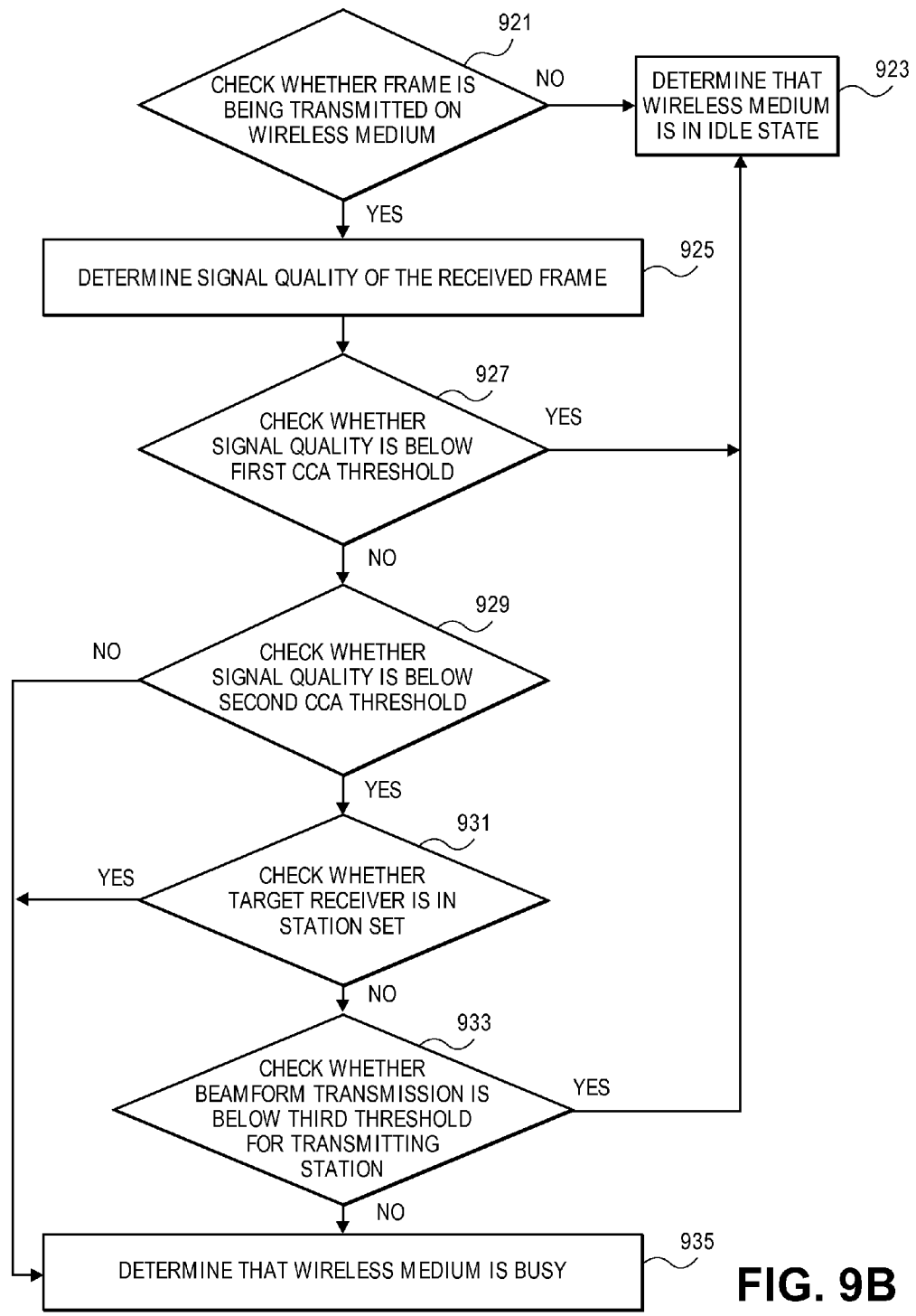
FIG. 9B is a flowchart of one embodiment of a process for an alternate CCA process.

FIG. 9B is a flowchart of one embodiment of a process for an alternate CCA process. This process is an example implementation of an enhanced CCA process using beam forming as described herein, where an implementing station seeks to transmit on a given wireless channel in a wireless communication system. As with the preceding example embodiment, the process can be initiated when a frame of any sort is queued for transmission in a first station, then a check is made to determine whether a frame from a second station is already being transmitted on the wireless medium such as a wireless channel (Block 921). The receiver of the implementing station can continuously monitor the wireless medium to detect frames on the wireless medium as part of a channel access process and carrier sensing process detailed further herein. If there is no frame being transmitted on the wireless medium, then the wireless medium may be determined to be idle (Block 923). Following the determination that the shared wireless medium is idle for a random backoff and/or IFS time period, the implementing station may transmit its queued frame. However, if there is a frame being transmitted on the shared wireless medium (which can be determined from detecting a preamble in the signal on the wireless medium) then the signal quality level of the frame being currently transmitted on the wireless medium can be determined (Block 925). In some instances, the frame cannot be discretely detected, but the signal quality of a transmitting signal can be detected and utilized.

A determination is then made whether the transmitting frame is coming from a distant station that would not be disrupted by simultaneous transmission on the wireless medium. For example, a check is made whether the signal quality of the frame is below a first CCA threshold (e.g., a CCA threshold such as −82 dBm for a 20 Mhz channel) (Block 927). If the signal quality is below this first threshold, then the signal originates far away and the wireless medium is considered to be idle (Block 923). Following the determination that the shared wireless medium is idle for a random backoff and/or IFS time period, the implementing station may transmit its queued frame. If the signal quality of the received frame is not below the first CCA threshold, then a check is made whether the signal quality is below a second CCA threshold (Block 929). The second CCA threshold represents a more aggressive enhanced CCA process that aims to increase throughput in the wireless communication system by allowing the station to more liberally access the shared wireless medium. If the received frame is not below the second CCA threshold then the wireless medium is considered busy (Block 923) and the transmission from the implementing station will not proceed until the current transmission and/or reply complete and the medium is determined to be idle. If the received frame has a signal quality that is below the second CCA threshold then a check is made whether the target receiver of the received frame is in the nearby station set using station identifier or similar station identification information from the received frame (Block 931). If the target receiver of the received frame is in the set, then the wireless medium is considered busy and the transmission of the queued frame waits until the frame transmission completes and any reply completes (Block 935). If the target receiver of the received frame is not in the nearby station set, then a check is made whether interference to the transmitting station by a beamformed transmission would be below a third threshold (Block 933) (i.e., whether a null beam may be steered toward the transmitting station).

If the interference to the transmitting station by the beamform transmission would not be below the third threshold, then the wireless medium is considered busy and the transmission of the queued frame waits until the frame transmission completes and any reply completes (Block 935) before reanalyzing the shared wireless medium for transmission of its queued frame. If the beamform transmission would be below the third threshold then the wireless medium is considered idle (Block 923). Following the determination that the shared wireless medium is idle for a random backoff and/or IFS time period, the implementing station may transmit its queued frame.

Figure 9C:
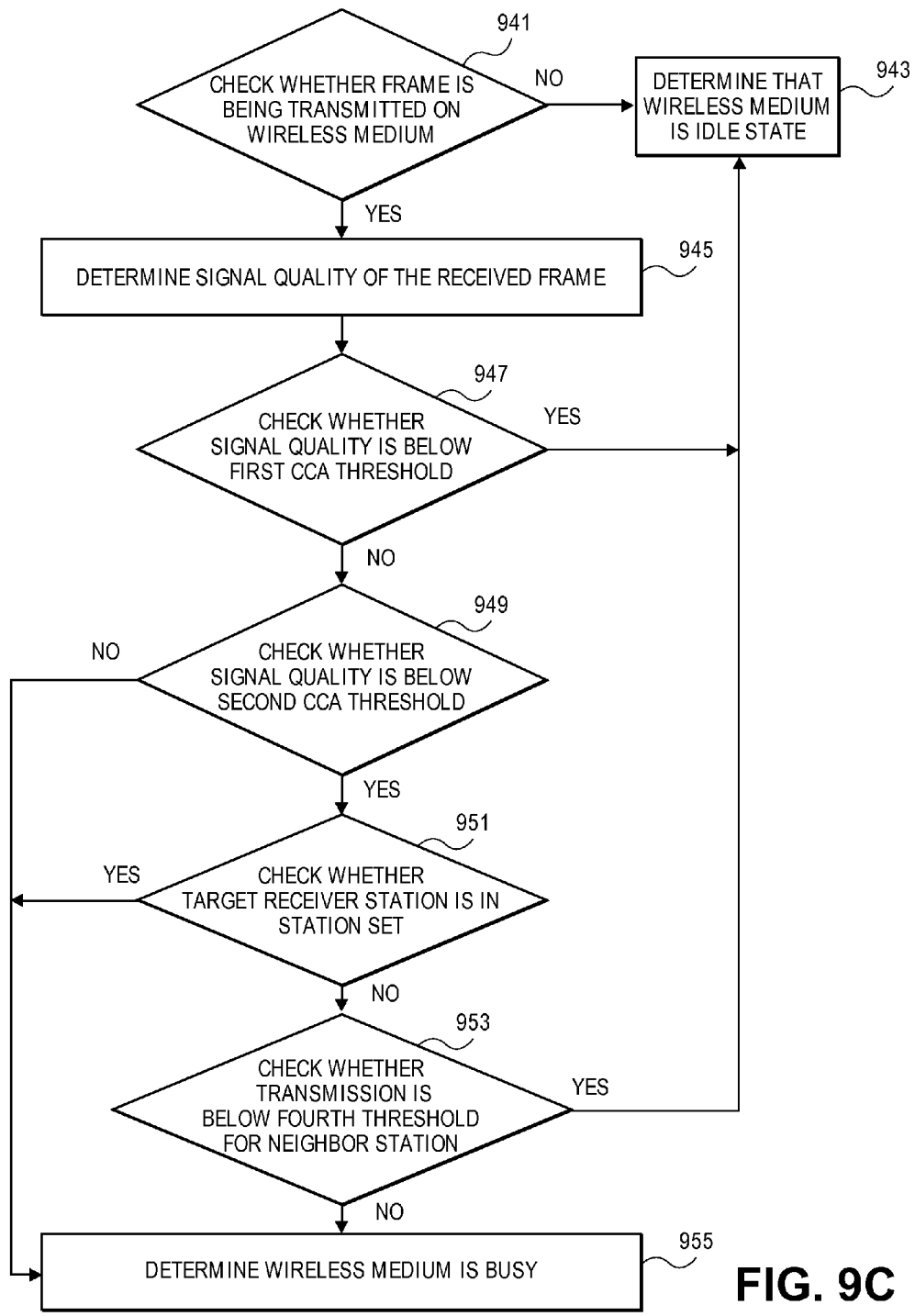
FIG. 9C is a flowchart of one embodiment of a process for another alternate CCA process.

FIG. 9C is a flowchart of one embodiment of a process for another alternate CCA process. This process is another example of an enhanced CCA process as described herein, where an implementing station seeks to transmit on a given wireless channel in a wireless communication system. As with the preceding embodiment, the process can be initiated when a frame of any sort from a first/implementing station is queued for transmission, then a check is made to determine whether a frame from a second station is already being transmitted on the wireless medium such as a wireless channel (Block 941). The receiver of the implementing station can continuously monitor the wireless medium to detect frames on the wireless medium as part of a channel access process and carrier sensing process detailed further herein. If there is no frame being transmitted on the wireless medium then the medium may be determined to be idle/not busy (Block 943). Following the determination that the shared wireless medium is idle for a random backoff and/or IFS time period, the implementing station may transmit its queued frame. However, if there is a frame being transmitted (which can be determined from detecting a preamble in the signal on the wireless medium) then the signal quality level of the frame being received on the wireless medium can be determined (Block 945). In some instances, the frame cannot be discretely detected, but the signal quality of a transmitting signal can be detected and utilized.

A determination is then made whether the transmitting frame is coming from a distant station that would not be disrupted by simultaneous transmission on the wireless medium. For example, a check is made whether the signal quality level of the frame is below a first CCA threshold (e.g., a 'standard' CCA threshold such as −82 dBm for a 20 Mhz channel) (Block 947). If the signal strength is below this first threshold, then the signal originates far away and the wireless medium is considered to be idle (Block 943). Following the determination that the shared wireless medium is idle for a random backoff and/or IFS time period, the implementing station may transmit its queued frame. If the signal strength of the received frame is not below the first CCA threshold, then a check is made whether the signal quality is below a second CCA threshold (Block 949). The second CCA threshold represents a more aggressive enhanced CCA process that aims to increase throughput in the wireless communication system by allowing the station to more liberally access the shared wireless medium. If the received frame is not below the second CCA threshold then the wired medium is considered busy and the transmission from the implementing station will not proceed until the current transmission and/or reply complete (Block 955). If the received frame has a signal strength that is below the second CCA threshold then a check is made whether the target receiver of the received frame is in the nearby station set using station identifier or information identifying the target receiver from the received frame (Block 951). If the target receiver of the received frame is in the set, then the wireless medium is considered busy and the transmission of the queued frame waits until the frame transmission completes and any reply completes (Block 955). If the target receiver of the received frame is not in the nearby station set, then a check is made whether a transmission could be sent with a transmission power below a fourth threshold (Block 953). The fourth threshold can represent a transmission power at the implementing station/transmitting station that is estimated to not interfere with nearby neighbor communications while still reaching the intended target(s). If the transmission could not be below the fourth threshold, then the wireless medium is considered busy and the transmission of the queued frame waits until the frame transmission completes and any reply completes (Block 955). If the transmission could be below the fourth threshold, then the wireless medium is considered idle frame (Block 943). Following the determination that the shared wireless medium is idle for a random backoff and/or IFS time period, the implementing station may transmit its queued frame.

Although FIGS. 9A-9C are described as maintaining a list or a set of neighboring/nearby stations, in some embodiments a list of neighboring/stations is not maintained. For example, in some embodiments an instantaneous determination may be made regarding whether the target recipient is nearby (i.e., is a neighbor) to another station using one or more of the techniques described herein.

Figure 10:
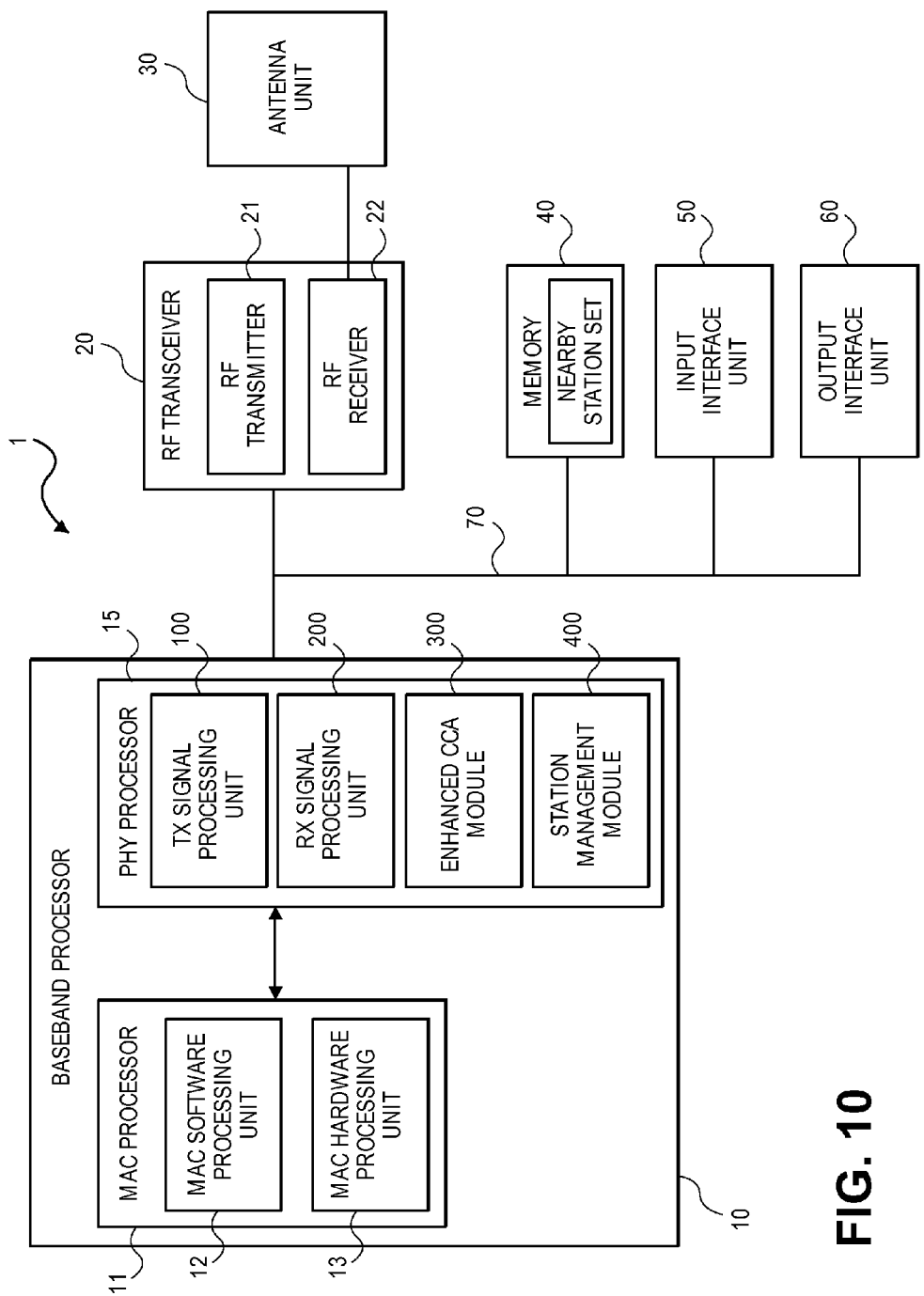
FIG. 10 is a diagram of a network device implementing a station or access point that executes an enhanced CCA process.
Figure 13:
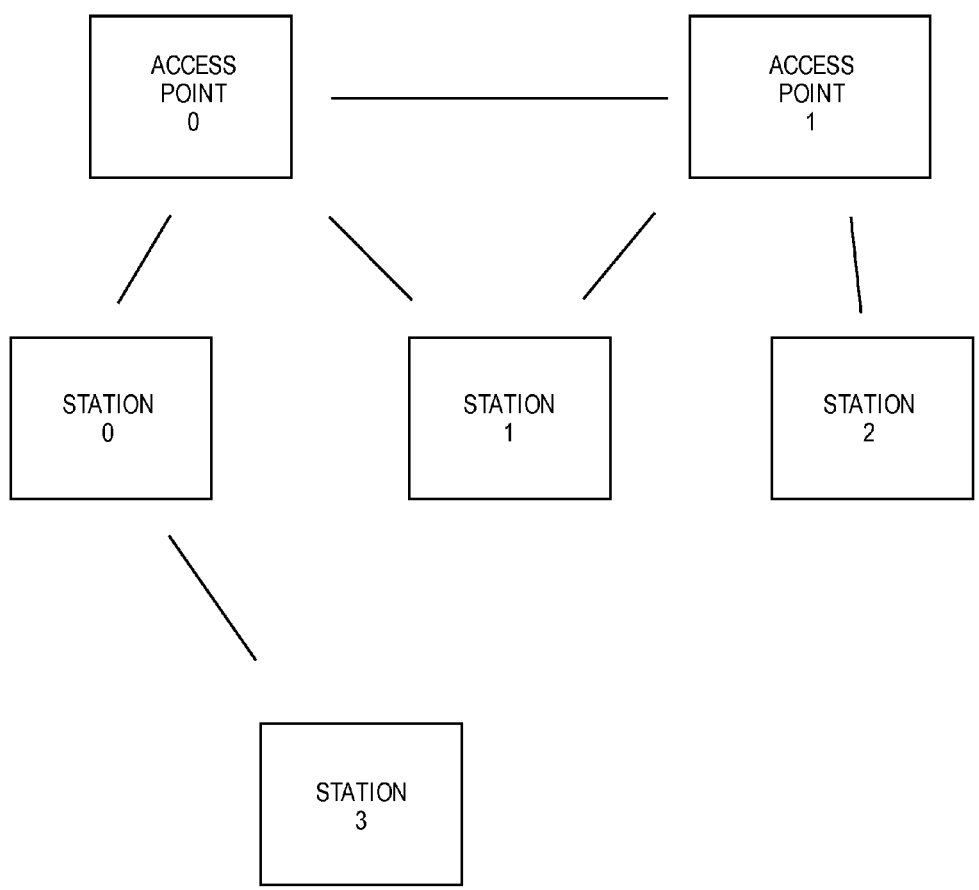
FIG. 13 is a diagram of an example wireless local area network.

FIG. 10 is a diagram of a network device implementing a station or access point that executes an enhanced CCA process. In a wireless local area network (WLAN) such as the example WLAN illustrated in FIG. 13, a basic service set (BSS) includes a plurality of network devices referred to herein as WLAN devices. Each of the WLAN devices may include a medium access control (MAC) layer and a physical (PHY) layer according to IEEE (Institute of Electrical and Electronics Engineers) 802.11 standard. In the plurality of WLAN devices, at least one WLAN device may be an access point (AP) station (e.g., access point 0 and access point 1 in FIG. 13) and the other WLAN devices may be non-AP stations (non-AP STAs), (e.g., stations 0-3 in FIG. 13). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 13, a WLAN can have any combination of stations and access points that can form discrete network, an ad hoc network or any combination thereof. Any number of APs and stations can be included in a WLAN and any topology and configuration of such APs and stations in the network can be utilized.

Referring to FIG. 10, the example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC).

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 11 and 12. In some embodiments, the PHY processor 15 can also implement the enhanced CCA module 300 and/or the station set management module 400. The enhanced CCA module 300 and the station set management module 400 can implement the respective functions for any combination of the embodiments described herein above with regard to FIGS. 1-9. In other embodiments, these modules may be implemented by or distributed over both the PHY processor 15 and the MAC processor 11. These modules may be implemented as software or as hardware components of either the PHY processor 15 or MAC processor 11. These modules can be implemented as components of the transmitting signal processing unit 100 and the receiving signal processing unit 200 or as discrete components. In a further embodiment, the enhanced CCA module 300 and/or the station set management module 400 can be implemented by separate components or processors within the baseband processor.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store the nearby stations set. The input interface unit 50 receives information from a user and the output interface unit 60 outputs information to the user.

The antenna unit 30 includes one or more antennas. When a multiple-input multiple-output (MIMO) or a multi-user MIMO (MU-MIMO) system is used, the antenna unit 30 may include a plurality of antennas.

FIG. 11 is a schematic block diagram exemplifying a transmitting signal processor in a WLAN device. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input—multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

FIG. 12 a schematic block diagram exemplifying a receiving signal processing unit in the WLAN. Referring to FIG. 12, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

A frame as used herein may refer to a data frame, a control frame, or a management frame may be exchanged between WLAN devices. The data frame is used for transmission of data forwarded to a higher layer. The WLAN device transmits the data frame when the wireless medium is considered to be in an idle condition or state such as after performing backoff if a DIFS has elapsed from a time when the medium was not busy or under similar conditions. The management frame is used for exchanging management information, which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for an associated access category (AC), i.e., AIFS[AC] has elapsed. In this case, the data frame, the management frame, or the control frame, which is not the response frame, may use the AIFS[AC].

As discussed herein CCA and in particular an enhanced CCA module is implemented to manage the transmission of frames by the WLAN device. CCA may implement a CSMA (carrier sense multiple access)/CA (collision avoidance) based frame transmission procedure or similar procedure for avoiding collisions between frames in a channel.

Figure 14:
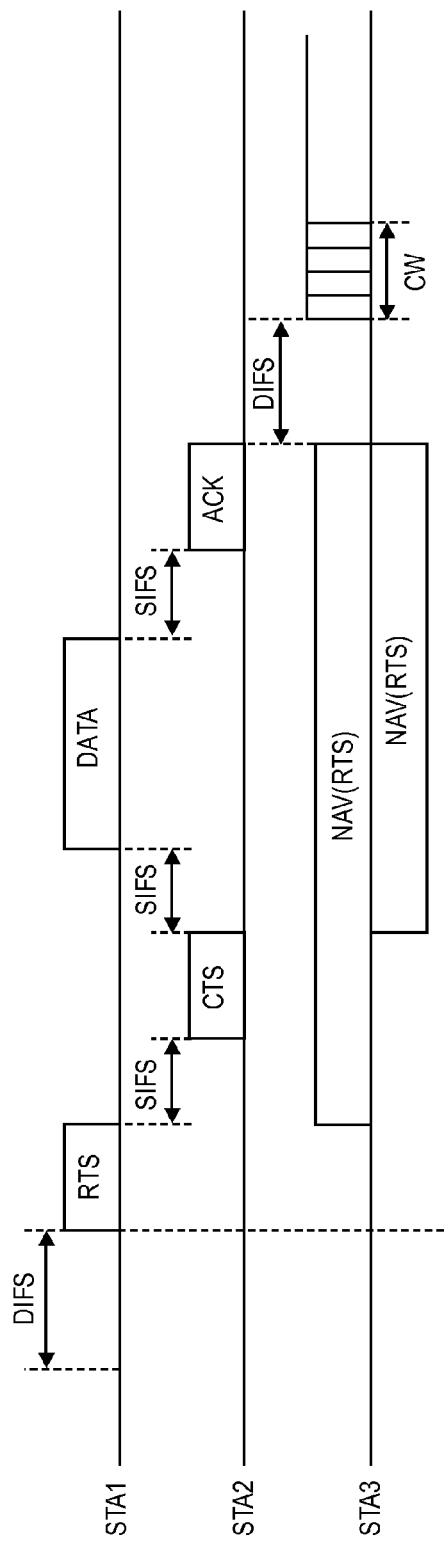
FIG. 14 is a timing diagram providing an example of the carrier sense multiple access/collision avoidance (CSMA/CA) transmission procedure.

FIG. 14 is a timing diagram providing an example of the CSMA/CA transmission procedure. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

The PHY entity for 802.11 implemented in the WLAN device is based on orthogonal frequency division multiple access OFDM or OFDMA. In either OFDM or OFDMA PHY layers, a STA is capable of transmitting and receiving PPDUs that are compliant with the mandatory PHY specifications. In a PHY specification, set of MCS and maximum number of spatial streams are defined. Also in some PHY entities, downlink and/or uplink MU transmission with a maximum number of space-time streams per user and up to a fix total number of space-time streams is defined.

Figures 15, 16:
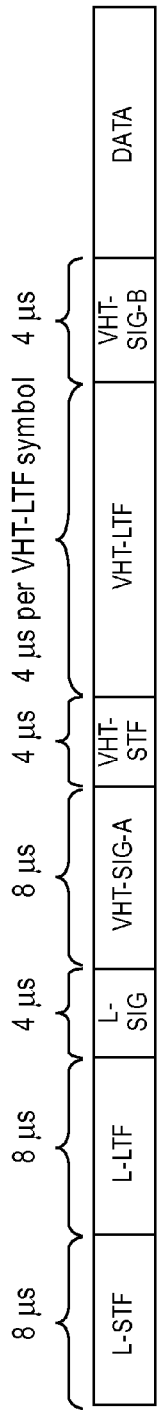
FIG. 15 is a diagram of a very high throughput (VHT) physical layer convergence protocol (PLCP) protocol data unit PPDU utilized by a WLAN device physical layer.
FIG. 16 is a table of the fields of the VHT PPDU.

FIG. 15 is a diagram of a very high throughput (VHT) PPDU utilized by the WLAN device PHY layer. FIG. 16 is a table of the fields of the VHT PPDU. Some PHY entities define PPDU that are individually addressed (where identification is based on AID or Partial AID) and some are group addressed (where identification is based on Group ID, GID). Some PHY entities provide support for 20 MHz, 40 MHz, 80 MHz and 160 MHz contiguous channel widths and support for 80+80 MHz non-contiguous channel width. The data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of ½, ⅔, ¾ and ⅚.

In each PHY entity, there would be fields denoted as L-SIG, SGI-A, SIG-B where some crucial information about the PSDU attributes are listed. These symbols are usually encoded with the most robust MCS. The L-SIG, SGI-A, SIG-B have very limited number of bits and it is desired to encode them in the most compact form possible. In a receiving STA, first these symbols are decoded in order to obtain vital information about the PSDU attributes and some MAC attributes. In IEEE 802.11ac, these symbols are called VHT SIG-A and VHT SIG-B symbols.

As discussed above, WLAN devices are currently being deployed in diverse environments. These environments are characterized by the existence of many access points and non-AP stations in geographically limited areas. Increased interference from neighboring devices gives rise to performance degradation. Additionally WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved power consumption for battery-operated devices.

IEEE 802.11 ax or HE SIG-A and IEEE 802.11 ax or HE SIG-B are referred to simply as simply by SIG-A and SIG-B and are amendments to the 802.11 standard directed at addressing these problems. Unlike previous amendments where the focus was on improving aggregate throughput, this amendment focuses on improving metrics that reflect user experience, such as average per station throughput, the 5th percentile of per station throughput of a group of stations, and area throughput. Improvements will be made to support environments such as wireless corporate office, outdoor hotspot, dense residential apartments, and stadiums.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

Note the operations of the flowcharts are described with reference to the exemplary embodiments of the diagrams. However, it should be understood that the operations of flowcharts can be performed by embodiments of the invention other than those discussed, and the embodiments of the diagrams can perform operations different than those discussed with reference to the flowcharts.

While the flowcharts in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a first network device, the method to improve efficiency for clear channel assessment (CCA) in a wireless local area network (WLAN), the method comprising:
   detecting, by the first network device, a wireless signal from a second network device on a wireless medium;
   determining whether a target network device of the wireless signal is a neighbor of the first network device; and
   determining that the wireless medium is busy in response to determining that the target network device is a neighbor of the first network device.

2. The method of claim 1, further comprising:
   determining the wireless medium is busy when a signal quality of the wireless signal is above a first threshold or the target network device of the wireless signal is a neighbor of the first network device.

3. The method of claim 1, further comprising:
   determining the wireless medium is busy when a signal quality of the wireless signal is between a first threshold and a second threshold and the target network device of the wireless signal is a neighbor of the first network device.

4. The method of claim 1, further comprising:
   determining the target network device is a neighbor of the first network device based on a basic service set (BSS) of the wireless signal.

5. The method of claim 1, further comprising:
   determining the wireless medium is idle when a signal quality of the wireless signal is above a first threshold and the target network device is not a neighbor of the first network device.

6. The method of claim 1, further comprising:
   determining the wireless medium is idle when a signal quality of the wireless signal is between a first threshold and a second threshold and the target network device is not a neighbor of the first network device.

7. The method of claim 1, wherein determining that the target network device is a neighbor of the first network device includes:
   detecting a frame from the target network device; and
   determining that a signal quality level of the frame is above a neighbor threshold value.

8. The method of claim 7, wherein determining that the target network device is a neighbor of the first network device further includes:
   determining any one or more of a media access control (MAC) address, basic service set identifier (BSSID), Partial BSSID, or color of the target network device in the frame.

9. The method of claim 7, wherein the frame is a beacon frame transmitted by the target network device.

10. The method of claim 1, wherein the wireless signal has a signal quality that is any one or more of an energy level or a signal-to-noise ratio.

11. The method of claim 1, further comprising:
    determining the wireless medium is idle when a signal quality of the wireless signal is above a first threshold, the target network device is not a neighbor of the first network device, and a beamform transmission from the first network device and directed at a third network device is expected to be received at the second network device with a signal quality below a third threshold.

12. The method of claim 1, further comprising:
    determining the wireless medium is idle when a signal quality of the wireless signal is above a first threshold, the target network device is not a neighbor of the first network device, and a transmission from the first network device to a third network device has a transmission power below a fourth threshold.

13. A network device to implement a method to improve efficiency for clear channel assessment (CCA) in a wireless local area network (WLAN), the network device comprising:
    a non-transitory machine readable medium having stored therein an enhanced CCA module; and
    a processor coupled to the non-transitory machine readable medium, the processor configured to execute the enhanced CCA module, the enhanced CCA module configured to detect a wireless signal from a second network device on a wireless medium, determine whether a target network device of the wireless signal is a neighbor of the first network devices, and determine that the wireless medium is busy or idle in response to determining that the target network device is a neighbor of the first network device.

* * * * *